United States Patent
Saxena et al.

(10) Patent No.: US 7,317,896 B1
(45) Date of Patent: Jan. 8, 2008

(54) MOBILE WIRELESS ROUTER

(75) Inventors: Piyush Saxena, Cranston, RI (US); Joseph J. Loberti, Saunderstown, RI (US)

(73) Assignee: American Power Conversion Corporation, West Kingston, RI (US)

( * ) Notice: Subject to any disclaimer, the term of this patent is extended or adjusted under 35 U.S.C. 154(b) by 418 days.

(21) Appl. No.: 10/649,031

(22) Filed: Aug. 27, 2003

(51) Int. Cl.
*H04B 7/00* (2006.01)

(52) U.S. Cl. ............ 455/41.2; 307/151; 370/294; 200/51.03; 455/11.1; 455/90.3; 455/562.1

(58) Field of Classification Search .......... 455/41.2, 455/11.1, 90.3, 562.1; 307/150, 151, 38
See application file for complete search history.

(56) References Cited

U.S. PATENT DOCUMENTS

| | | | |
|---|---|---|---|
| 6,098,769 A * | 8/2000 | Yen | 190/108 |
| 6,561,328 B1 * | 5/2003 | Huang | 190/18 A |
| 6,608,264 B1 * | 8/2003 | Fouladpour | 200/51.03 |
| 6,757,269 B2 * | 6/2004 | Dorenbosch et al. | 370/338 |
| 6,936,936 B2 * | 8/2005 | Fischer et al. | 307/151 |
| 6,980,204 B1 * | 12/2005 | Hawkins et al. | 345/211 |
| 2002/0147031 A1 * | 10/2002 | Hood | 455/562 |
| 2002/0152285 A1 * | 10/2002 | Wheeler et al. | 709/218 |
| 2003/0135681 A1 * | 7/2003 | Laity et al. | 710/303 |

* cited by examiner

*Primary Examiner*—Matthew Anderson
*Assistant Examiner*—Sanh Phu
(74) *Attorney, Agent, or Firm*—Townsend and Townsend and Crew LLP

(57) ABSTRACT

A mobile communication system for wireless communications includes a power adapter configured to receive input power from a power source and to adapt the input power to an output power, the output power being within Universal Serial Bus (USB) standards, a USB cable coupled to the power adapter to transmit the output power from the power adapter, the USB cable including at least one USB connector, and a router configured to be coupled to the USB cable and configured to receive the output power transmitted by the USB cable to power components of the router such that the router can operate using the output power transmitted by the USB cable, the router including at least one antenna and being configured to communicate wirelessly through the at least one antenna with a wireless-enabled communication device.

8 Claims, 4 Drawing Sheets

MOBILE WIRELESS ROUTER

FIELD OF THE INVENTION

The invention relates to mobile systems for wireless communication.

BACKGROUND OF THE INVENTION

Wireless communication is commonplace in today's society, and wireless computer networking is becoming more common, both in the work place and at home. To accommodate the desire for wireless networking, wireless access points (often called "hot spots") are showing up throughout the world. Further, mobile computers (e.g., laptops, notebooks) are often upgraded with wireless access cards or include built-in wireless networking functionality. People can communicate wirelessly through computer networks, allowing users to work freely without having their computer hardwired to a network, e.g., connected via a cable directly to a physical network connection such as a local area network (LAN).

Computers and other devices can communicate with a network through wireless connection circuits and a wireless router. Wireless routers include circuitry for both wired and wireless communications, e.g., four landline communication ports for wired communications.

SUMMARY OF THE INVENTION

In general, in an aspect, the invention provides a mobile communication system for wireless communications, the system including a power adapter configured to receive input power from a power source and to adapt the input power to an output power, the output power being within Universal Serial Bus (USB) standards, a USB cable coupled to the power adapter to transmit the output power from the power adapter, the USB cable including at least one USB connector, and a router configured to be coupled to the USB cable and configured to receive the output power transmitted by the USB cable to power components of the router such that the router can operate using the output power transmitted by the USB cable, the router including at least one antenna and being configured to communicate wirelessly through the at least one antenna with a wireless-enabled communication device.

Implementations of the invention may include one or more of the following features. The router is configured to operate using only the power transmitted by the USB cable. The router is configured to operate using power with about 5V of voltage and between about 0.5 A and about 1.0 A of current. The router includes a housing having dimensions of less than about 6" by less than about 4" by less than about 2". The router includes communication components only for wireless communications with personal-use computing devices through the at least one antenna. The router is configured to communicate with PCMCIA cards through the at least one antenna. The at least one USB connector of the USB cable includes a female USB connector, the system further comprising a power cable that includes a male USB connector on a first end of the power cable for coupling with the female USB connector of the USB cable and includes a female power connector on a second end of the power cable, the female power connector configured to be inserted into a power port of the router. The system further includes a power bag configured with at least a first compartment and a second compartment, the first compartment be configured to receive, store, and protect a laptop computer, and the second compartment including a plurality of pockets configured to receive the power adapter and the router, respectively.

In general, in another aspect, the invention provides a mobile communication system for wireless communications, the system including a power adapter configured to receive input power from a power source and to adapt the input power to an output power, the output power having a voltage of about 5V and a current of about 1 A or less, a router configured to receive the output power from the power adapter to power components of the router such that the router can operate using only the output power from the power adapter, the router including at least one antenna and being configured to communicate wirelessly through the at least one antenna with a wireless-enabled communication device, and cabling configured to couple the power adapter to the router to provide the output power from the power adapter to the router.

Implementations of the invention may include one or more of the following features. The router is configured to operate using power with about 5V of voltage and between about 0.5 A and about 1.0 A of current. The power adapter includes a Universal Serial Bus (USB) port at which the output power is provided. The cabling includes: a USB cable that includes a male USB connector at a first end for coupling to the USB port of the power adapter, and includes a splitter at a second end with at least two female USB ports; and a power cable that includes a male USB connector on a first end of the power cable configured to be inserted in one of the female USB ports of the USB cable, and includes a female power connector on a second end of the power cable, the female power connector configured to be inserted into a power port of the router.

In general, in another aspect, the invention provides a wireless router configured for wireless communications only, the router including multiple antennas configured to transmit and receive wireless communications, communication circuitry coupled to the antennas and consisting of components configured for electronic communication and that are coupled for wireless communications only with personal-use computing devices, and a power port configured to couple to a power cable and to receive power from the power cable, where the communication circuitry is coupled to the power port and is configured to operate using the power received at the power port if the received power is within Universal Serial Bus (USB) standards having an associated voltage of about 5V and an associated current of between about 0.5 A and about 1.0 A.

Implementations of the invention may include one or more of the following features. The router further includes a housing configured to house the communication circuitry, the housing having dimensions of less than about 6" by less than about 4" by less than about 2". The antennas are rotationally coupled to the housing, the antennas sized and disposed such that the router has dimensions of less than about 6" by less than about 5" by less than about 2" with the antennas disposed alongside a length of the housing.

Various aspects of the invention may provide one or more of the following advantages. A wireless router can be powered through a standard USB cable. A wireless router can be powered with a voltage less than about 6V, e.g., 5V or less. A wireless router can be powered from a wall outlet using an outlet-to-5V adapter. A wireless router can be provided that is less than about 6" by about 3" by about 2", e.g., about 5.5"×3"×1.5". A wireless router can be powered from the same power adapter used for powering/charging other electronic devices such as personal digital assistants and mobile phones. Fewer components and less weight can be carried in a travel bag that provides for mobile wireless communications between a computer network and wireless electronic devices than with previous designs.

These and other advantages of the invention, along with the invention itself, will be more fully understood after a review of the following figures, detailed description, and claims.

DETAILED DESCRIPTION OF PREFERRED EMBODIMENTS

Embodiments of the invention provide techniques for facilitating wireless communications. A portable bag can carry various wireless communication devices such as a personal computer, a personal digital assistant, and a telephone. The bag may also carry a power source such as a battery, a travel power adapter configured to convert wall outlet power to appropriate power for the wireless communication devices, e.g., to recharge batteries of these devices. The bag may further carry a wireless mobile router that is configured to communicate wirelessly with the wireless communication devices (e.g., through wireless communication cards), and to a communication network such as the Internet. The wireless router is configured to receive power, that is within limits that may be provided through a USB power cable, from the power adapter and to be powered via this power. The power may be received through a power port that is configured to receive power from a wall-outlet, 5V adapter, with the adapter supplying the power through a USB cable, and an adapter cable connecting the USB cable to the router's power port. The wireless router preferably includes only wireless communication apparatus and is of a size and weight that facilitate carrying the router in the portable bag. Other embodiments are within the scope of the invention.

Figure 1:
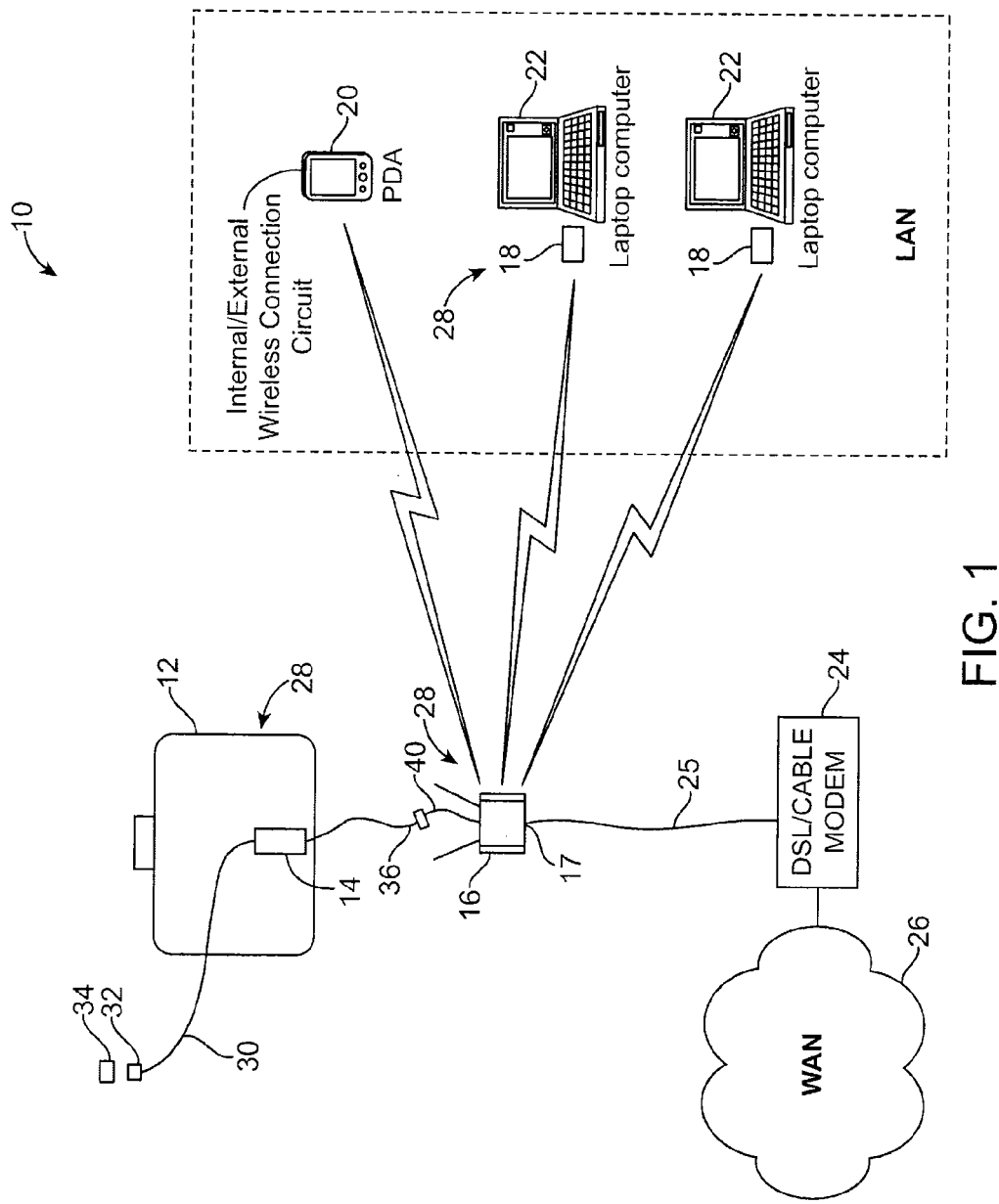
FIG. 1 is a simplified diagram of a communication system that includes wireless and wired communication components.

Referring to FIG. 1, a system 10 for providing wireless network communications includes a carry bag 12, a power adapter 14, a wireless mobile router 16, wireless connection cards 18, a personal digital assistant (PDA) 20, laptop computers 22, a DSL/cable modem 24, and a wide area network (WAN) 26 such as the global packet-switched network known as the Internet. The wireless connection cards 18 may be, e.g., standard PCMCIA cards for wirelessly communicating with the router 16. The cards 18, the router 16, and the power adapter 14 are preferably provided together as part of a wireless communication system 28 that may also include the bag 12. The router 16 includes a standard RJ-45 connection 17 for network/Internet connections to couple the router 16 to the DSL/cable modem 24 through a line 25.

The power adapter 14 is configured to receive AC or DC power, and to supply various output voltage levels through various configurations of connections/cables. Preferably, the power adapter 14 can receive power through a line 30 from either an AC or a DC power source. The line 30 is equipped with a connector 32, e.g., a recessed 2-pronged connector configured to connect to a DC power source, and may include an adapter 34 for coupling to and adapting the connector 32 to connect to other types of connectors such as a wall outlet (e.g., a 2- or 3-prong connector). The power adapter 14 may transform or convert the received power into voltages between about 15 VDC and about 20 VDC. Further, the power adapter 14 is configured to provide power through a USB (Universal Serial Bus) line 36.

The adapter 14 can provide power on the USB line 36, through a USB connector connected to a USB port of the adapter 14, for powering/charging various components. The adapter 14 can provide power comprising about 5 VDC and about 1 A on the line 36. Five volts and one amp are the maximum voltage and amperage allowable under the USB standard. The power provided on the USB line 36 can be used to power and/or charge various devices, e.g., the PDA 20, a mobile phone 23, or the router 16.

Figure 2:
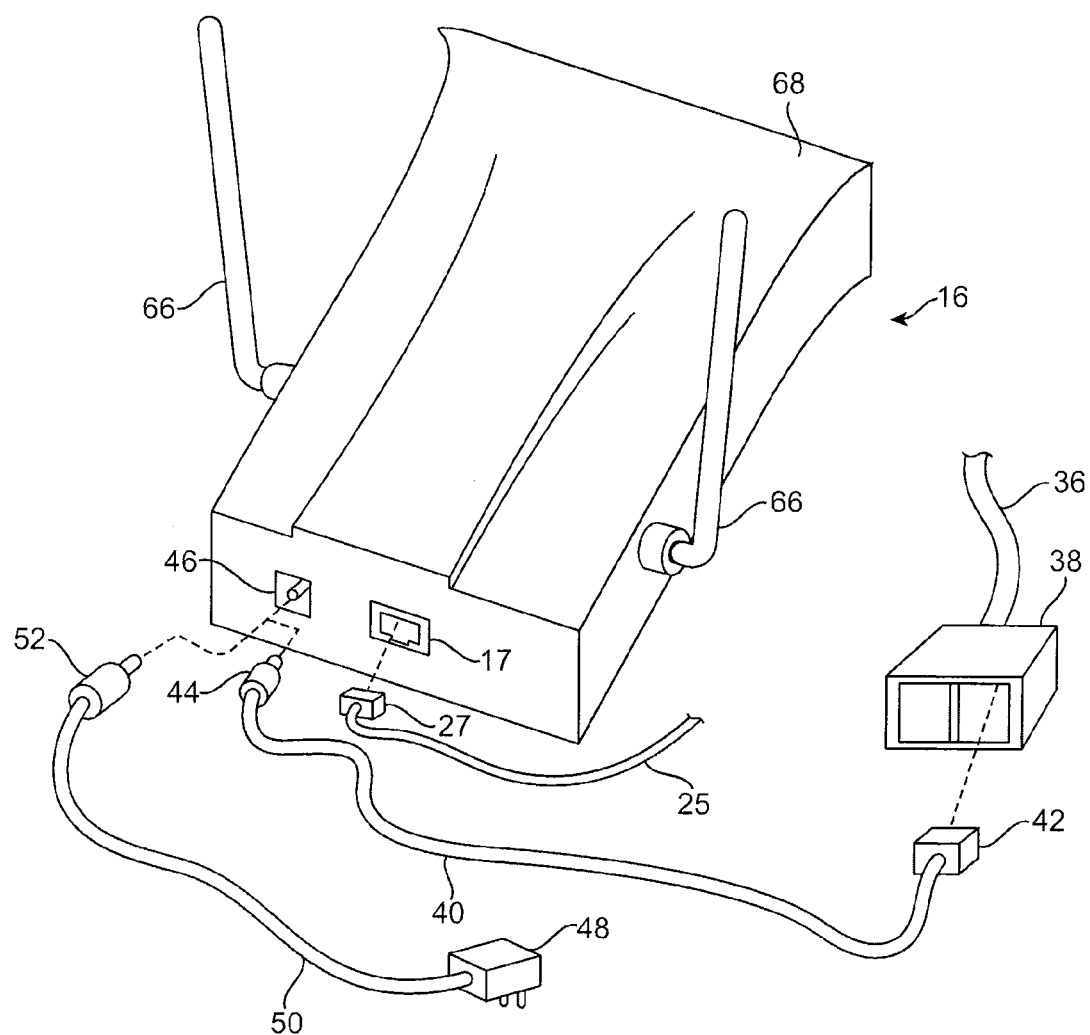
FIG. 2 is a perspective view of a wireless router and cabling shown in FIG. 1.

Referring also to FIG. 2, the router 16 can be coupled to the USB line 36 and be powered by power received through the line 36. The line 36 terminates with a female USB connector 38, that may be a splitter that provides multiple, here two, female USB ports. Using a 2-way splitter, each output port can provide up to the 5V and 1 A maximum of the line 36 (assuming no current is drawn by the other output port), with the total output current being no more than the 1 A limit of the line 36. A line 40 has one end terminated in a male USB connector 42 that is configured to mate with (couple to) the connector 38. At its other end, the line 40 has a female connector 44 that is configured to couple with a single, center-prong male power port 46 of the router 16. A converter brick 48 may be provided for use in adapting wall outlet power to appropriate power for powering the router 16. The converter brick 48 is attached to a cable 50 and configured to be plugged into a standard wall socket. The cable 50 is attached to a connector 52 that is configured to couple to the power port 46. The line 25 is attached to an RJ-45 connector 27 configured to be inserted in the RJ-45 connection port 17 on the router 16. Another RJ-45 connector on the other end of the line 25 is not shown.

The router 16 includes power circuitry that is configured to use the power received through the line 40 or the line 50 to provide power to other components of the router 16 to provide wireless communication with the communication cards 18, and to communicate with the network 26 via the DSL/cable modem 24. The router 16 is configured to be operational if receiving at least about 5V and between about 0.5 A and about 1.0 A from either of the lines 44 or 50. Preferably, the router 16 includes only components for wireless communications, e.g., with the PDA 20 and the computers 22 through the wireless connection cards 18. Thus, preferably the router 16 does not include components for wired connections with the PDA 20, the computers 22, or other personal-use computing devices. The router 16 therefore preferably does not have components such as four ports of land-line connections typically found in routers with both wired and wireless capabilities.

The router 16 is preferably configured to be a compact, lightweight, wireless-only router. Being streamlined as a wireless-only router, the router 16 is able to have a small form factor and weight. For example, the router 16 preferably has a housing with dimensions of less than about 6" by less than about 4" by less than about 2". More preferably, the router 16 has a length of about 5.25", a width including two antennas 66 of about 4.75" with antennas (and without antennas of about 3-3.5"), and a height (with the antennas 66 disposed alongside the length of a housing or body 68 of the router 16 as shown in FIG. 3) of 1.25", although other dimensions are acceptable.

Figure 3:
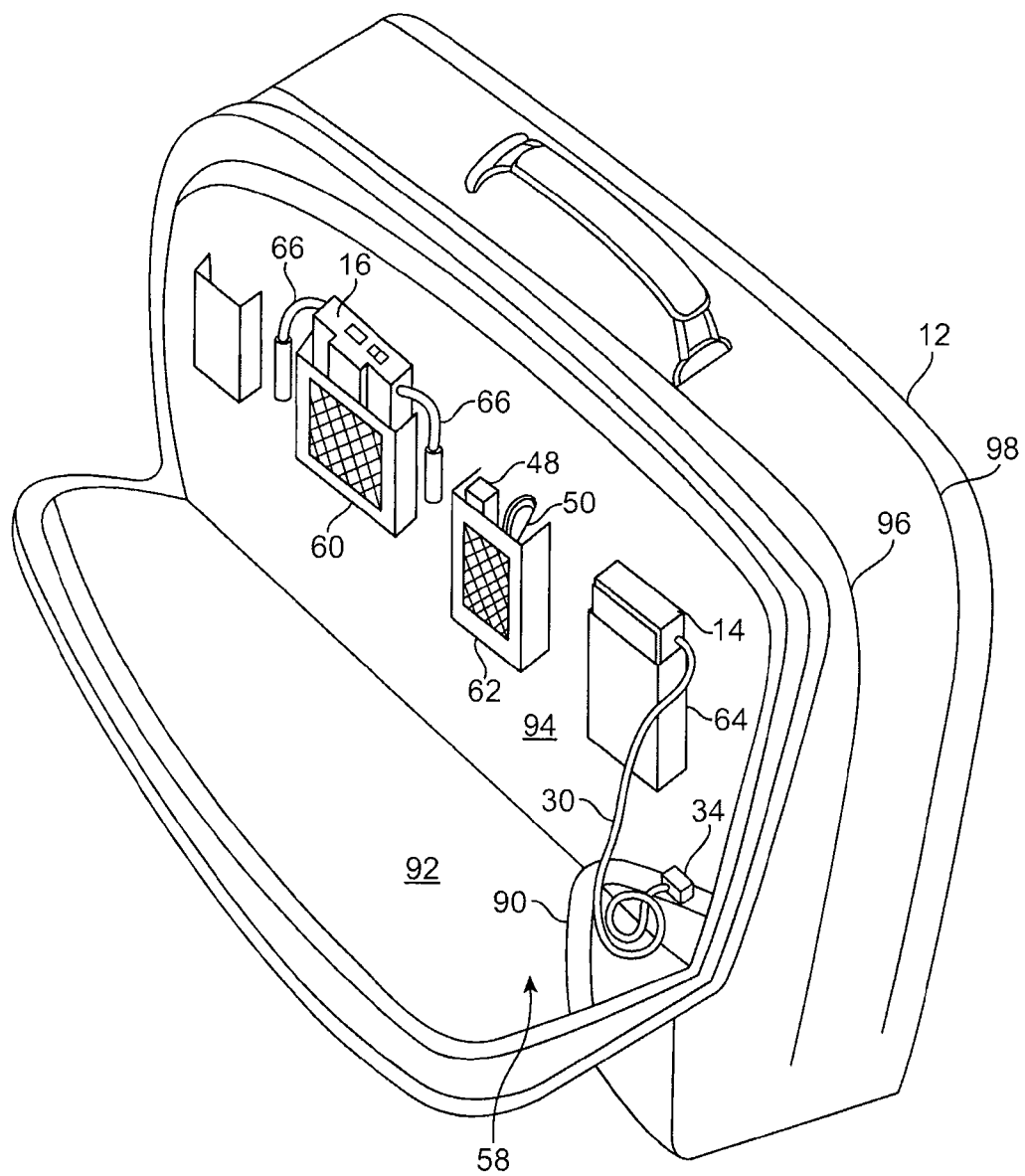
FIG. 3 is a perspective view of a power bag shown in FIG. 1 with other devices shown in FIG. 1 stored in the power bag.

Referring also to FIG. 3, the power bag 12 is configured to conveniently store and hold the power adapter 14, the router 16, the cables 30, 36, and the converter brick 48 and its associated cable 50 and connector 52. As shown, these components can fit into a single zippered pocket/storage compartment 58 of the power bag 12. The compartment 58 may be an exterior compartment of the bag 12, i.e., not the main compartment in which one of the laptop computers 22 may be stored. The bag 12 has other compartments 96, 98 for storing other items such as one of the laptop computers 22, the PDA 20, a mobile telephone, etc. The bag 12 is configured for portability and travel and is preferably sized to be used as a carry-on bag on an airplane. The compartment 58 is sized to accommodate and house the adapter 14, the router 16, the brick 48, associated cables and connectors, and miscellaneous other items. The compartment 58 has dimensions of from about 12-18 inches by about 8-12 inches by about 2-4 inches and preferably has padded/cushioned walls. The adapter 14, the router 16, and the brick 48 can be inserted into respective pouches/pockets 60, 62, 64 that may be made of, e.g., a padded nylon, and that include exterior pouches, e.g., for storing the associated cables. These pouches may be made of, e.g., a nylon mesh. The bag 12 further comprises other pockets or straps for holding the cables of the system 10. For example, a strap 90 is coupled to opposing walls 92, 94 forming the compartment 58 and is sized and disposed to retain the cable 30, the connector 32 (FIG. 1), and the adapter 34.

Figure 4:
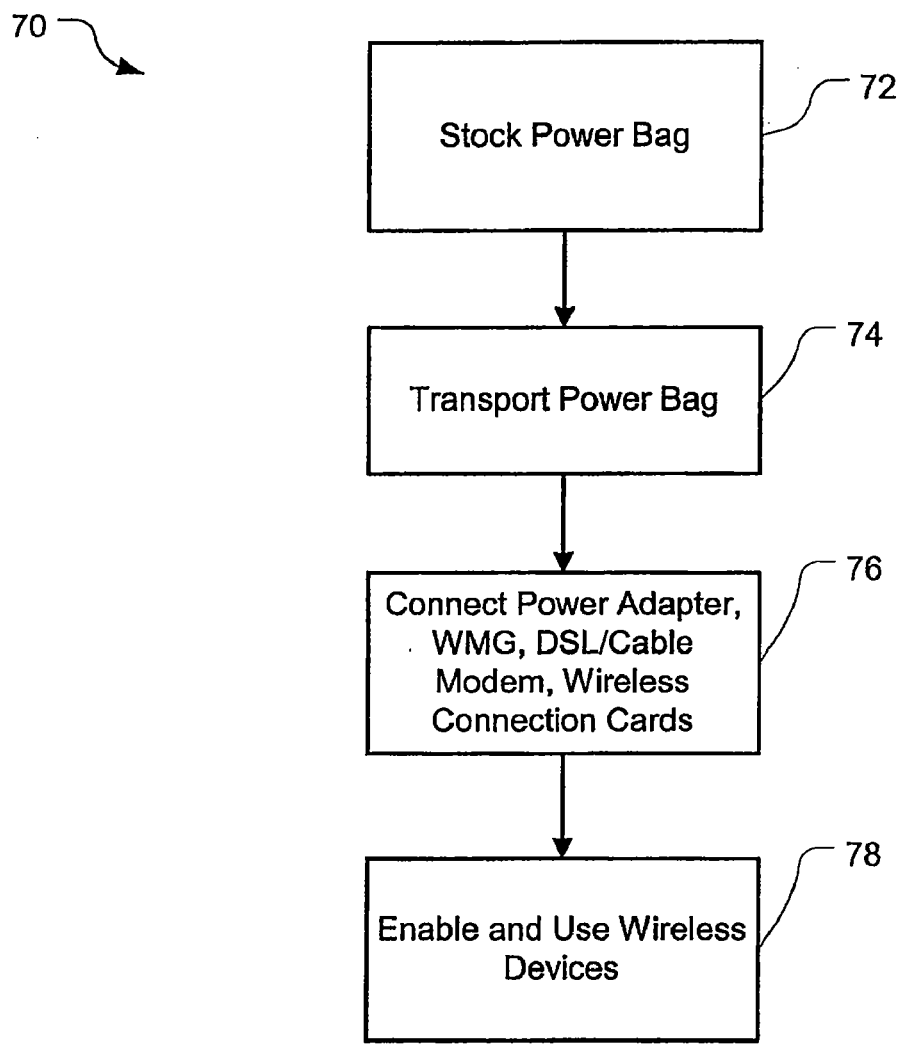
FIG. 4 is a block flow diagram of a process of using the system shown in FIG. 1 for wireless communication.

In operation, referring to FIG. 4, with further reference to FIGS. 1-3, a process 70 for establishing and using a wireless communication link to a WAN using the system 10 includes the stages shown. The process 70, however, is exemplary only and not limiting. The process 70 may be altered, e.g., by having stages added, removed, or rearranged.

At stage 72, the power bag 12 is stocked with various devices. The power adapter 14, the router 16, and the converter brick 48 are stored in their respective pockets 60, 62, 64. The various corresponding cables 26, 30, 35 are put into nearby pockets in the compartment 58. Also, other appropriate items such as the PDA 20 and a laptop computer 22 are put into appropriate pockets or compartments. The pockets and compartments storing the devices are closed, e.g., by connecting hook and loop fasteners, zipping zippers, etc.

At stage 74, the power bag 12, with the stored devices, is transported in the power bag 12. The bag 12 may be carried on an airplane, put in a car or other vehicle, or hand carried to a desired destination. The bag 12 provides protection to the stored devices.

At stage 76, the power bag devices are connected and set up for use for wireless communications. The compartment 58 is opened and the line 30 is connected to an appropriate power source. For example, the adapter 34 may be coupled to the termination 32, and the adapter 34 inserted into a wall outlet. The line 40 is coupled to the splitter 36 by inserting the connector 42 into the connector 38 and inserting the connector 44 into the power port 46 of the router 16. Alternatively, the converter brick 48 can be coupled to the wall outlet and the connector 52 inserted into the power port 46. The RJ-45 connector of the Ethernet line 25 is inserted into the router 16 and the line 25 is connected to the DSL/cable modem 24 to couple to the WAN 26. The connection to the DSL/cable modem may be made, e.g., by plugging the line 25 into an Ethernet wall jack. Such jacks are frequently provided in offices, hotel rooms, conference rooms, etc.

At stage 78, the desired wireless device(s) are wireless enabled, if need be, and used for wireless communication with the WAN 26. One of the communication cards 18 is inserted into the laptop computer 22 that was stored in the power bag 12, and the PDA 20 is removed from the bag 12. The devices 20, 22 are manipulated to communicate through the router 16 and the DSL/cable modem 24 with the WAN 26. Thus, for example, a user can place the power bag 12 in a hotel room, connect the devices as described above, and venture around the hotel room or further, e.g., to the hotel pool, and be able to communicate with the WAN 26, e.g., to retrieve documents from the users' work, retrieve and send emails, surf the Internet, etc.

Other embodiments are within the scope and spirit of the appended claims. For example, other form factors of, and materials for, the router 16 may be used, as well as other types of connectors than those described above. Also, while the router 16 has been described as being operational with an input power comprising 5V and between about 0.5 A and about 1.0 A, other powers may be usable, especially lower powers.

What is claimed is:

1. A mobile communication system for wireless communications, the system comprising:
   a power adapter configured to receive input power from a power source and to adapt the input power to an output power, the output power being within Universal Serial Bus (USB) standards;
   a USB cable coupled to the power adapter to transmit the output power from the power adapter, the USB cable including at least one USB connector; and
   a router configured to be coupled to the USB cable and configured to receive the output power transmitted by the USB cable to power components of the router such that the router can operate using the output power transmitted by the USB cable, the router including at least one antenna and being configured to directly communicate wirelessly through the at least one antenna with a wireless-enabled communication device, the router including communication components only for wireless communications with personal-use computing devices through the at least one antenna, the router being configured to communicate with PCM-CIA cards through the at least one antenna;
   wherein the router is configured to provide a direct wireless network connection to a plurality of the wireless-enabled communication devices.

2. The system of claim 1 wherein the router is configured to operate using only the power transmitted by the USB cable.

3. The system of claim 2 wherein the router is configured to operate using power with about 5V of voltage and between about 0.5 A and about 1.0 A of current.

4. The system of claim 1 wherein the router includes a housing having dimensions of less than about 6" by less than about 4" by less than about 2".

5. The system of claim 1 wherein the at least one USB connector of the USB cable includes a female USB connector, the system further comprising a power cable that includes a male USB connector on a first end of the power cable for coupling with the female USB connector of the USB cable and includes a female power connector on a second end of the power cable, the female power connector configured to be inserted into a power port of the router.

6. The system of claim 1 further comprising a power bag configured with at least a first compartment and a second compartment, the first compartment be configured to receive, store, and protect a laptop computer, and the second compartment including a plurality of pockets configured to receive the power adapter and the router, respectively.

7. A mobile communication system for wireless communications, the system comprising:
   a power adapter configured to receive input power from a power source and to adapt the input power to an output power, the output power having a voltage of about 5V and a current of about 1 A or less, the power adapter including a Universal Serial Bus (USB) port at which the output power is provided;
   a router configured to receive the output power from the power adapter to power components of the router such that the router can operate using only the output power from the power adapter, the router including at least one antenna and being configured to directly communicate wirelessly through the at least one antenna with a wireless-enabled communication device; and
   cabling configured to couple the power adapter to the router to provide the output power from the power adapter to the router;
   wherein the router is configured to provide a direct wireless network connection to a plurality of the wireless-enabled communication devices; and
   wherein the cabling includes:
      a USB cable that includes a male USB connector at a first end for coupling to the USB port of the power adapter, and includes a splitter at a second end with at least two female USB ports; and
      a power cable that includes a male USB connector on a first end of the power cable configured to be inserted in one of the female USB ports of the USB cable, and includes a female power connector on a second end of the power cable, the female power connector configured to be inserted into a power port of the router.

8. The system of claim 7 wherein the router is configured to operate using power with about 5V of voltage and between about 0.5 A and about 1.0 A of current.

* * * * *